United States Patent [19]
Yanagihara

[11] Patent Number: 5,459,617
[45] Date of Patent: Oct. 17, 1995

[54] APPARATUS AND METHODS FOR RECORDING INFORMATION SIGNALS AND TRACKING SIGNALS ON MAGNETIC TAPE

[75] Inventor: Naofumi Yanagihara, Tokyo, Japan

[73] Assignee: Sony Corporation, Tokyo, Japan

[21] Appl. No.: 139,635

[22] Filed: Oct. 20, 1993

Related U.S. Application Data

[63] Continuation of Ser. No. 702,289, May 20, 1991, abandoned.

[30] Foreign Application Priority Data

May 28, 1990 [JP] Japan .................................. 2-137875

[51] Int. Cl.$^6$ ...................................... G11B 5/02
[52] U.S. Cl. ..................... 360/21; 360/77.13; 360/77.14
[58] Field of Search .............................. 360/77.14, 10.2, 360/84, 14.1, 77.01, 18, 21, 77.15

[56] References Cited

U.S. PATENT DOCUMENTS

| | | | |
|---|---|---|---|
| 3,665,118 | 5/1972 | Cooper, Jr. ............................ | 360/21 X |
| 4,482,928 | 11/1984 | Moriya ..................................... | 360/77 |
| 5,065,259 | 11/1991 | Kubota et al. ............................ | 360/32 |
| 5,124,853 | 6/1992 | Kashida et al. ....................... | 360/77.14 |

FOREIGN PATENT DOCUMENTS

| | | |
|---|---|---|
| 312362 | 4/1989 | European Pat. Off. . |
| 376675 | 7/1990 | European Pat. Off. . |
| 380284 | 8/1990 | European Pat. Off. . |
| 3618236 | 12/1987 | Germany ............................. 360/14.1 |

OTHER PUBLICATIONS

*Webster's Ninth New Collegiate Dictionary*, p/ 1176. ©1991 by Murian–Webster, Inc., principal ©1983.

Primary Examiner—W. R. Young
Attorney, Agent, or Firm—William S. Frommer; Alvin Sinderbrand

[57] ABSTRACT

An apparatus for recording information and tracking signals on magnetic tape includes first and second magnetic heads for recording the information signals on the magnetic tape. The first and second magnetic heads are mounted for rotation about an axis for scanning the magnetic tape for recording the information signals in successive tracks. The first and second magnetic heads are disposed at respective positions along the axis separated from one another by substantially one track pitch and have respectively different azimuth angles. A third magnetic head serves to record the tracking signals on the magnetic tape and is mounted at a position rotationally substantially opposite a rotational position of the first magnetic head and is substantially axially aligned therewith. In accordance with a method of recording information and tracking signals on magnetic tape, the information signals are recorded on the magnetic tape with the use of first and second magnetic heads mounted for rotation about an axis at respective axial positions spaced by substantially one track pitch. The first and second magnetic heads have respectively different azimuth angles, such that the information signals are recorded at correspondingly different azimuth angles in successive tracks. The tracking signals are recorded in at least some of the successive tracks with azimuth angles substantially the same as those of the information signals in adjacent ones of the successive tracks.

11 Claims, 4 Drawing Sheets

5,459,617

APPARATUS AND METHODS FOR RECORDING INFORMATION SIGNALS AND TRACKING SIGNALS ON MAGNETIC TAPE

This application is a continuation of application Ser. No. 07/702,289, filed May 20, 1991, now abandoned.

BACKGROUND OF THE INVENTION

The present invention relates to apparatus and methods for recording information signals, such as video signals, and tracking control signals with the use of rotary magnetic heads.

In conventional video recording, video signals are recorded on a magnetic tape in successive tracks with the use of a helical scan rotary head assembly. The video signals may be recorded either in analog or digital form, the latter providing improved signal quality upon signal reproduction. In reproducing the signals, it is essential that the slant tracks as recorded are accurately scanned so that the recorded signals are faithfully reproduced. Accordingly, tracking control is employed to ensure that the previously recorded tracks are accurately followed upon reproduction. Digital audio tape (DAT) apparatus typically utilize similar tracking control techniques where the audio signals are recorded in slant tracks.

In one type of tracking control arrangement, proper positioning of the heads with respect to the slant tracks is carried out with the assistance of a control signal recorded along a longitudinal edge of the magnetic tape. This longitudinally recorded control signal is reproduced by a stationary head; and tape movement is adjusted if there is a phase difference between the reproduced control signal and a position signal representing the rotary position of the heads.

However, this technique requires the use of a stationary head which is used for no other purpose. This head adds to the overall cost of the signal recording/playback apparatus and, more importantly, it impedes miniaturization of that apparatus. If the stationary head can be eliminated, the overall size of the apparatus can be reduced correspondingly.

The assignee of the present application has proposed a technique for carrying out tracking control utilizing tracking control signals mixed with information signals in the slant tracks (Japanese patent publication No. 59-112406). This permits the stationary head to be eliminated by utilizing the transducer which reproduces useful information to reproduce the tracking control signals as well. Digital video and digital audio recording are particularly suited for this approach because digital information signals are easily multiplexed with control signals without loss of useful information, they may be time-base compressed easily and they may be readily processed. Accordingly, in a particular track, a tracking control signal may be recorded in a restricted region apart from other regions of the track where digital information signals are recorded.

In one implementation of this proposal, a pilot signal is recorded in the tracks independently of the digital signals. Advantageously, digital video and digital audio signals may be recorded in tracks having no guard bands between them. While this increases the amount of magnetic tape made available to record useful information, it is essential to provide precise tracking control as the playback heads scan the respective tracks. Typically, the heads used for recording and/or reproduction exhibit a gap length larger than the width of a track, which means that an edge of a preceding track is overwritten when the next adjacent track is recorded. This also means that when a playback head is in proper alignment with the pre-recorded track, the signals recorded in both adjacent tracks are picked up as crosstalk components. This phenomenon of crosstalk pickup is used to detect tracking errors and to provide proper tracking control of the scanning heads.

In the arrangement mentioned above, wherein pilot signals of a predetermined frequency are recorded in restricted regions of alternate tracks, a pair of heads having respectively different azimuth angles is used to scan two adjacent tracks substantially simultaneously. Hence, when one head scans the track in which the pilot signal is recorded, the other head scans the adjacent track which has no pilot signal therein. These two heads are mounted on the same rotary head assembly, such as a rotary head drum, and are relatively closely spaced thereon. The head which scans the track having no pilot signal therein will pick up, as a crosstalk component, the pilot signal recorded in an adjacent preceding track as well as the pilot signal recorded in an adjacent following track. If the magnitude of the crosstalk pilot signal picked up by this head from the preceding track is equal to the magnitude of the pilot signal picked up from the following track, the heads are in proper alignment with respect to the tracks scanned thereby. A tracking error is detected if the crosstalk pilot signal magnitudes from the preceding and following tracks differ from each other. In that event, the tape transport is accelerated or decelerated to bring the heads back into proper tracking alignment.

The foregoing technique utilizing a single pilot signal frequency is relatively simple to implement as it uses the constant spacing of the heads for detecting tracking errors. However, alternate tracks are recorded by each of the heads so that the signals of successive tracks have different respective azimuth angles. Upon reproduction, the heads scan respective tracks in which signals are recorded with azimuth angles corresponding to those of the heads. Consequently, the pilot signals are detected as crosstalk by a magnetic head having a different head azimuth angle and their magnitudes, thus, are attenuated. Even though the frequency of the pilot signal is selected to minimize azimuth loss, it is nevertheless relatively difficult to detect such crosstalk pilot signals. This tends to reduce the detection accuracy of the pilot signals and to degrade the tracking control function. The reduction in sensitivity to the pilot signals due to azimuth loss can become significant where the difference in the azimuth angles is large or the track width is narrow.

OBJECTS AND SUMMARY OF INVENTION

It is an object of the present invention to provide an improved tracking signal recording apparatus and method which overcomes the aforenoted shortcomings and disadvantages encountered in the prior art.

Another object of the invention is to provide an improved tracking signal recording apparatus and method in which tracking signals can be reliably detected without azimuth loss.

In accordance with one aspect of the present invention, an apparatus for recording information signals and tracking signals on magnetic tape comprises: first and second magnetic head means for recording the information signals on the magnetic tape; mounting means for mounting the first and second magnetic head means for rotation about an axis for scanning the magnetic tape with the first and second magnetic head means to record the information signals in successive tracks on the magnetic tape, the first and second magnetic head means being disposed at respective positions along the axis separated from one another by substantially one track pitch and having respectively different azimuth angles; third magnetic head means for recording the tracking signals on the magnetic tape; the third magnetic head means being mounted by the mounting means at a position rotationally substantially opposite a rotational position of the first magnetic head means and substantially axially aligned therewith; and signal source means for providing the first and second magnetic head means with the information signals and the third magnetic head means with the tracking signals. Accordingly, the azimuth angle of the third magnetic head means may be selected to record the tracking control signals so that their azimuth is substantially the same as that of the reproducing head as it scans adjacent tracks to detect the information signals recorded therein. Therefore, the tracking control signals can be detected as crosstalk from the adjacent tracks without azimuth loss.

In accordance with another aspect of the present invention, a method of recording information signals and tracking signals on magnetic tape is provided, comprising the steps of: recording the information signals in successive tracks on the magnetic tape with the use of first and second magnetic head means mounted for rotation about an axis at respective axial positions spaced by substantially one track pitch and having respectively different azimuth angles, such that the information signals are recorded with correspondingly different azimuth angles in successive tracks; and recording the tracking signals in at least some of the successive tracks with azimuth angles substantially the same as those of the information signals in adjacent ones of the successive tracks. Therefore, as the information signals in a given track are reproduced by a magnetic head whose azimuth is selected to correspond with that of the information signals, the azimuth angles of the tracking signals in the adjacent tracks will substantially correspond with that of the reproducing head so that the tracking signals can be detected without azimuth loss.

The above, and other objects, features and advantages of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

DETAILED DESCRIPTION OF A PREFERRED EMBODIMENT

Figure 1:
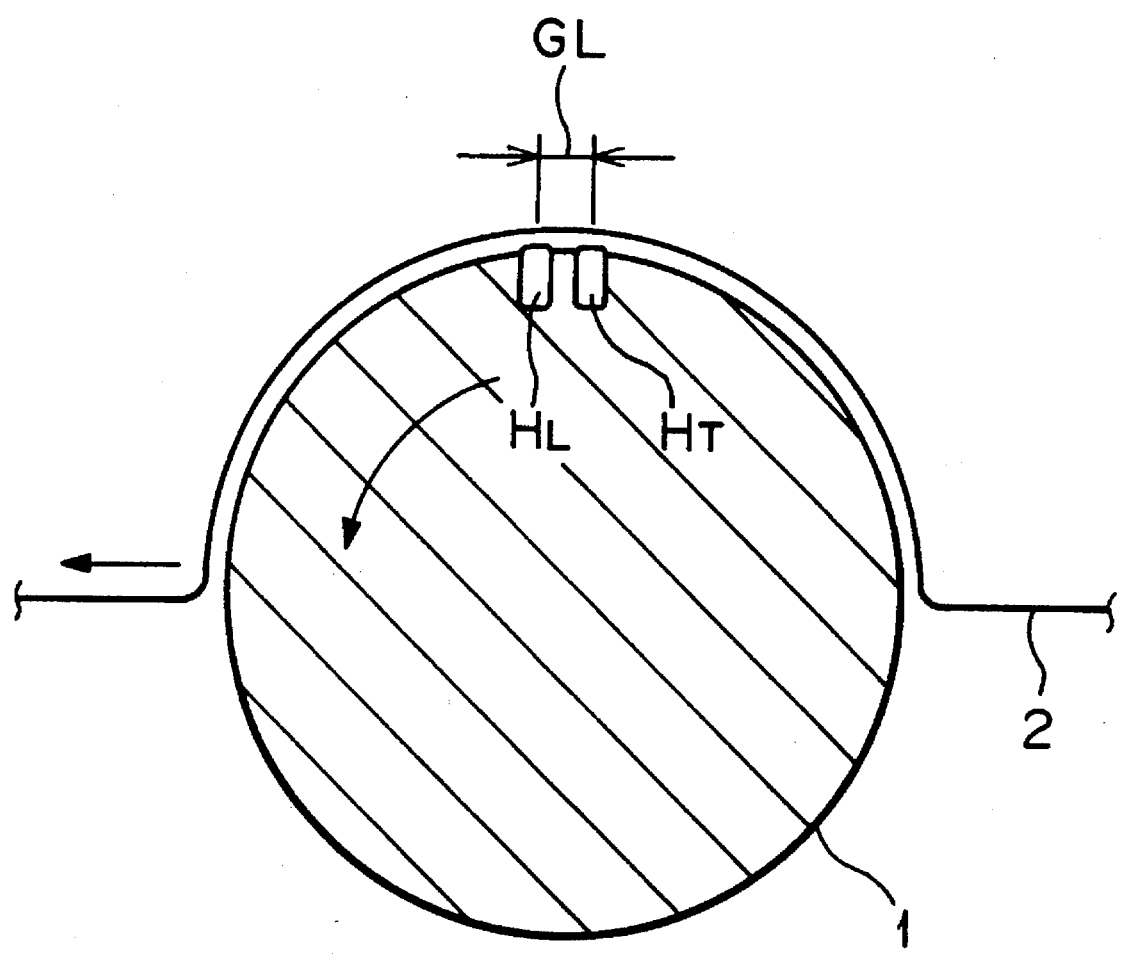
FIG. 1 is a schematic representation illustrating a rotary head drum which may be used in carrying out the aforementioned prior proposal.

Before describing the present invention, a detailed explanation of a prior proposal for detecting tracking errors is explained below in conjunction with FIGS. 1 and 2. FIG. 1 is a schematic representation of a rotary head assembly wherein a pair of playback heads $H_L$ and $H_T$ having different respective azimuth angles are mounted on a rotary head drum 1 about which a magnetic tape 2 is partially wrapped. Heads $H_L$ and $H_T$ are designated leading and trailing heads, respectively, and these heads are closely spaced so as to be angularly separated by a relatively short distance GL. In addition, and as will be best appreciated by reference to FIG. 2, heads $H_L$ and $H_T$ are offset from each other in the axial direction of drum 1. This offset is substantially equal to the pitch of the tracks scanned thereby. Although FIG. 1 illustrates tape 2 as being wrapped about a peripheral surface of drum 1 by an angular extent of about 180°, it will be appreciated that this wrap angle may be either greater or smaller. The leading and trailing heads function to scan a pair of tracks substantially simultaneously at each rotation of drum 1.

The arrangement shown in FIG. 1, wherein a pair of heads is mounted on a rotatable drum in closely spaced but axially offset relationship offers significant advantages over previously proposed mounting arrangements wherein two heads are mounted 180° apart. Tracks which are recorded by diametrically opposed heads may not be in alignment with each other because the rotary movement of the drum to scan one head across the tape may not be precisely the same as the rotary movement thereof to scan the other head. This difficulty is, of course, avoided when the heads are closely spaced to each other because both heads will be subjected to the very same irregularities that may be present in the drum's rotation. Therefore, the scanning trace of head $H_L$ is practically identical to the scanning trace of head $H_T$, and the resultant tracks scanned thereby are in precise alignment. Good effects are achieved even if the track pitch is made very small.

Figure 2:
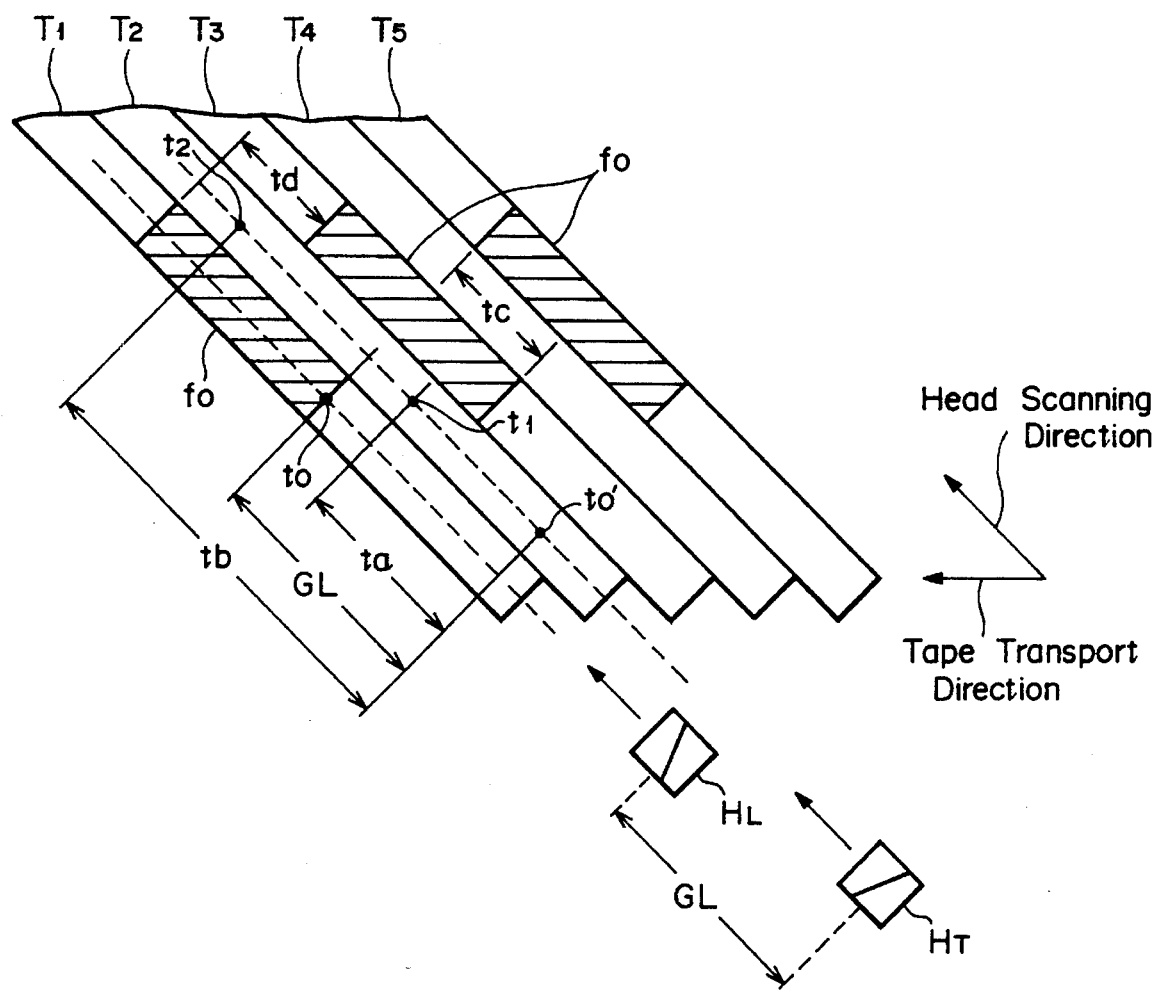
FIG. 2 is a schematic representation of recording tracks scanned by a pair of playback heads in accordance with the aforementioned prior proposal.

The track pattern scanned by heads $H_L$ and $H_T$ in FIG. 1 is illustrated schematically in FIG. 2. In this track pattern, a pilot signal of frequency $f_0$ is recorded in alternate tracks, such as in odd tracks $T_1$, $T_3$, $T_5$, etc. In accordance with the proposal made heretofore, the duration of the pilot signal is controlled such that the pilot signal is recorded in a restricted region in a track. The frequency of the pilot signal is on the order of several hundreds of kHz, but its frequency is selected to minimize azimuth loss.

When the signals are reproduced from the magnetic tape recorded in the manner illustrated in FIG. 2, pilot signal $f_0$ is reproduced when head $H_L$ reaches a point $t_O$ in track $T_1$. Because of the spacing GL between heads $H_L$ and $H_T$, head $H_T$ reaches point $t_0'$ in track $T_2$ when head $H_L$ first detects the pilot signal. It is seen that points $t_O$ and $t_0'$ are spaced apart by the distance GL, the same spacing exhibited between heads $H_L$ and $H_T$. It is recognized that, when head $H_L$ first detects the pilot signal, head $H_T$ is sufficiently distant therefrom as not to pick up a pilot signal crosstalk component, as yet. Rather, it is not until head $H_T$ advances to the position $t_1$ in track $T_2$ that a crosstalk pilot signal component will be picked up by this head from adjacent track $T_3$. It is seen that head $H_T$ reaches point $t_1$ at a delayed time $t_a$ from point $t_0'$. That is, at this delayed time $t_a$, head $H_T$ picks up a crosstalk pilot signal component from only one adjacent track, namely the right track $T_3$.

From FIG. 2, it is apparent that head $H_T$ reaches a portion of track $T_2$ whereat pilot signals $f_0$ are picked up as crosstalk components simultaneously from the left adjacent track $T_1$ and from the right adjacent track $T_3$. During the time that the pilot signal is picked up from both adjacent tracks, a determination cannot be made with respect to a tracking error. Hence, the tracking error detecting circuitry normally used with the arrangement shown in FIG. 2 is disabled or otherwise inhibited during the period of time that head $H_T$ picks up pilot signal crosstalk components from both tracks adjacent the track being scanned thereby.

When head $H_T$ reaches the point $t_2$ as it scans track $T_2$, the pilot signal crosstalk component picked up from the right adjacent track $T_3$ no longer is detected, and the pilot signal crosstalk component now is picked up from only the left adjacent track $T_1$. FIG. 2 illustrates that head $H_T$ arrives at point $t_2$ at a delayed time $t_b$ from point $t_0'$. Preferably, the pilot signal crosstalk component picked up from, for example, track $T_3$ is detected separately from the pilot signal crosstalk component picked up from the track $T_1$. A tracking error is determined by sensing the difference between the separately detected pilot signal crosstalk components. For example, if the magnitude of one pilot signal crosstalk component exceeds the magnitude of the other, it is concluded that the heads are not properly centered on the tracks and the tape is accelerated or decelerated to effect a shifting in the heads relative to the tracks scanned thereby. Hence, tracking errors are corrected.

The apparatus of FIG. 1 utilizes the same head to record both the information and pilot signals in each track. When the signals are reproduced utilizing a similarly constructed rotary head drum, each track is scanned by a head having an azimuth angle corresponding with that of the signals recorded in the track. Accordingly, the tracking signals picked up by the head as crosstalk from adjacent tracks have a different azimuth angle, so that their magnitude as detected by the head is attenuated. This can degrade the tracking operation, especially where the track pitch is small or the difference in the azimuth angles is large.

The present invention overcomes this difficulty associated with the proposal illustrated in FIGS. 1 and 2. A preferred embodiment of the present invention is now described with reference to FIGS. 3–5.

Figure 3:
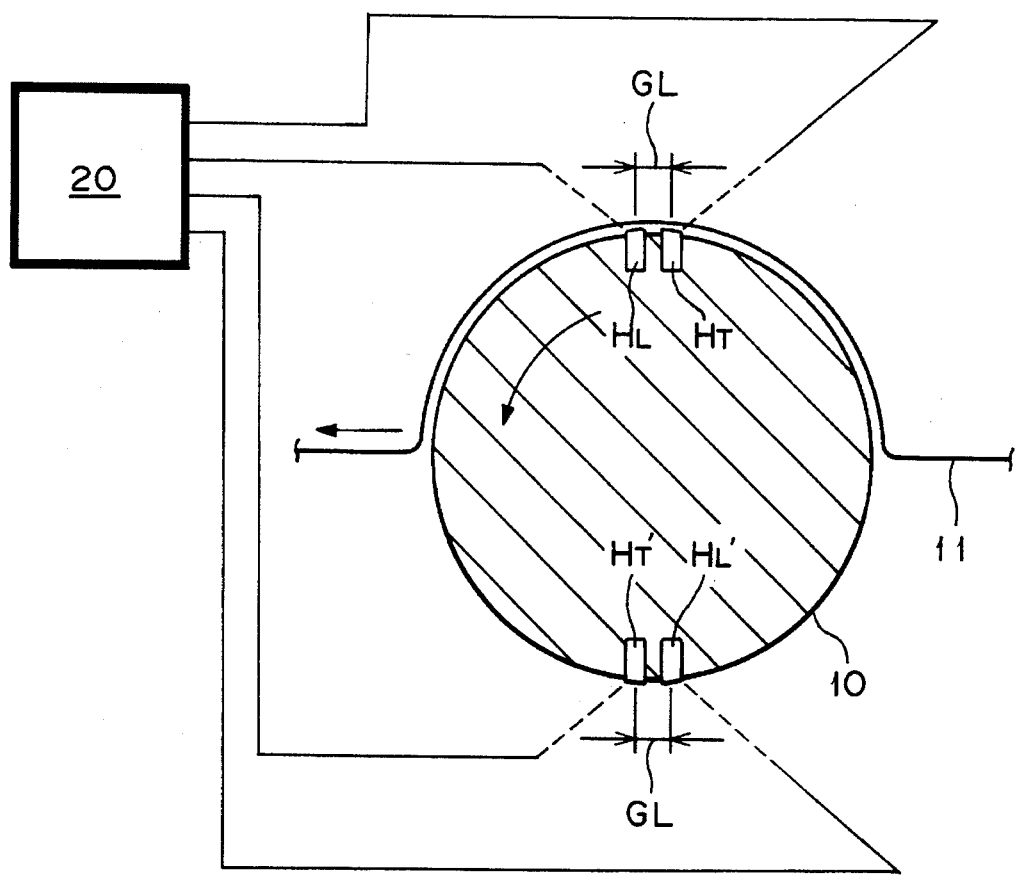
FIG. 3 is a schematic representation of an apparatus for recording information and tracking signals on video tape including a rotary head drum in accordance with an embodiment of the present invention.

With reference to FIG. 3, a rotary head drum 10 of a digital video tape recorder is illustrated therein. A magnetic tape 11 is shown wound about the head drum 10 for recording a digital video signal thereon. A first set of magnetic recording heads includes a leading head $H_L$ having a first azimuth angle and mounted on the periphery of the head drum 10 in a leading position, and a trailing head $H_T$ positioned on the periphery of the head drum 10 in a trailing position with respect to the leading head $H_L$ and having a second azimuth angle different from that of the leading head $H_L$. The leading head $H_L$ and the trailing head $H_T$ are angularly separated by a distance GL and arranged at respective axial positions with respect to the axis of rotation of the head drum 10 separated by a distance of one track pitch. The magnetic heads $H_L$ and $H_T$ together constitute a first set of double azimuth heads which serve to record adjacent slant tracks on the magnetic tape 11 as the head drum 10 rotates past the tape 11 as it is transported about the surface of the head drum 10.

A second pair of double azimuth heads is positioned on the periphery of the head drum 10 at a rotational position opposite that of the first set of double azimuth heads. The second set includes a leading head $H_L'$ and a trailing head $H_T'$, the leading head $H_L'$ having an axial position corresponding with that of the leading head $H_L$ of the first set, and the trailing head $H_T'$ having an axial position corresponding with that of the trailing head $H_T$ of the first set. Like the first set of double azimuth heads, the heads of the second set are axially spaced by one track pitch and are angularly separated by a distance GL. The leading head $H_L'$ of the second set has an azimuth angle corresponding with that of the leading head $H_L$ of the first set, while the trailing head $H_T'$ of the second set has an azimuth angle corresponding with that of the trailing head $H_T$ of the first set, so that the heads $H_L'$ and $H_T'$ of the second set have respectively different azimuth angles.

The embodiment of FIG. 3 is provided with two modes of operation. In the first mode of operation, the FIG. 3 embodiment is operative to either record or reproduce an NTSC-type video signal, that is, a standard definition video signal, in digital form. In this mode, only the heads $H_L$ and $H_T$ are employed to record the video signal. In a second mode of operation, the embodiment of FIG. 3 is operative to record a high-definition video signal in digital form with the use of all four heads mounted on the head drum 10. In the first mode of operation, the first set of magnetic heads $H_L$ and $H_T$ are provided with the digital video signal from a signal source 20 through a rotary transformer (not Shown for purposes of simplicity and clarity) for recording on the magnetic tape 11, while the second set of magnetic heads $H_L'$ and $H_T'$ are provided with only a pilot signal from the signal source 20 through a rotary transformer for recording on the tape 11. In this mode of operation, the tape 11 is transported at a first speed such that the magnetic heads $H_L$ and $H_T$ of the first set respectively scan first and second slant tracks on the tape, while at a subsequent time when the drum 10 has rotated 180° the magnetic heads $H_L'$ and $H_T'$ of the second set respectively scan the second track formed by the head $H_T$ and a third track which will be scanned subsequently by the head $H_L$. In the second mode of operation the tape is transported at a second speed twice the first speed so that first through fourth slant tracks are scanned by the heads $H_L$, $H_T$, $H_L'$ and $H_T'$ in that order. In the second mode, the signal source 20 provides the digital video signals to all four heads for recording on the tape 11.

Figure 4:
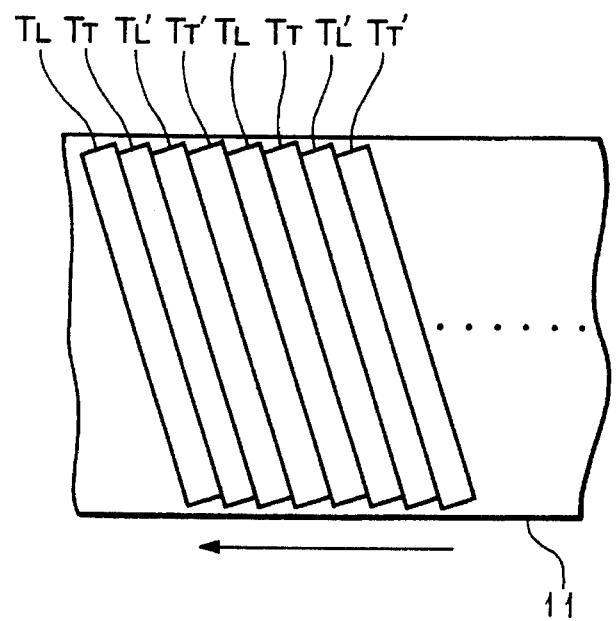
FIG. 4 is a schematic representation of recording tracks formed in one mode of operation by the rotary head drum of FIG. 3.

With reference now to FIG. 4, the pattern of slant tracks formed by the FIG. 3 embodiment in the second mode of operation is illustrated schematically therein. As shown in FIG. 4, the magnetic tape 11 is transported in a direction indicated by the arrow, so that during a first 180° of rotation of the head drum 10 the heads of the first set $H_L$ and $H_T$ respectively form slant tracks $T_L$ and $T_T$ in the tape 11. During the immediately subsequent 180° of rotation of the drum 10, the second set of heads $H_L'$ and $H_T'$ respectively form a second pair of slant tracks $T_L'$ and $T_T'$. Thereafter the first and second sets of heads alternately record corresponding pairs of tracks in the tape 11. Accordingly, in the second mode of operation, twice as many tracks are formed as in the first mode in a given time period, thereby making it possible to record substantially double the amount of the information as in the first mode for an identical time period for recording the relatively large amount of information included with a high definition video signal.

Figure 5:
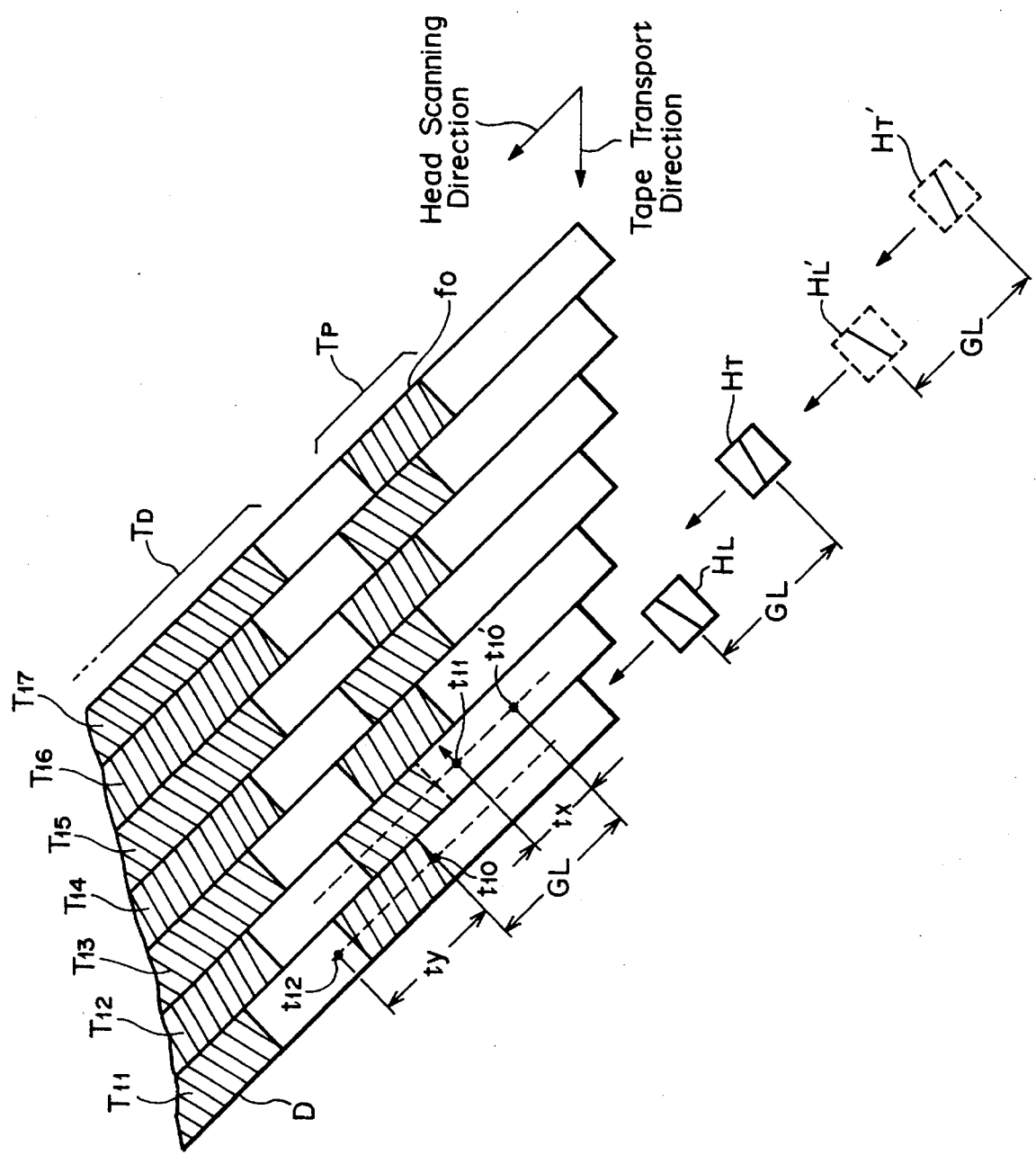
FIG. 5 is a schematic representation of recording tracks formed in a second mode of operation by the rotary head drum of FIG. 3.

The first mode of operation is now described with reference to FIG. 5. In this mode, the first set of heads $H_L$ and $H_T$ serve only to record the digital video data in data regions $T_D$ of each track, while the second set of heads $H_L'$ and $H_T'$ serve to record only a tracking pilot signal $f_0$ in separate pilot signal recording regions $T_P$ of each track. As shown in FIG. 5, the leading head $H_L$ and the trailing head $H_T$ during a first half cycle of the head drum's rotation record the digital video data in regions $T_D$ of tracks $T_{11}$ and $T_{12}$, respectively. During the next half cycle of the drum's rotation, the leading head $H_L'$ and trailing head $H_T'$ record pilot tracking signals in regions $T_P$ respectively in the track $T_{12}$ formed one half cycle before by the trailing head $H_T$ and in a track $T_{13}$ which will be scanned by the leading head $H_L$ of the first set in the next half cycle of the drum's rotation. As the drum 10 continues to rotate, the first set of heads $H_L$ and $H_T$ scan a subsequent pair of tracks $T_{13}$ and $T_{14}$ recording the digital video data in the regions $T_D$ separated from the regions $T_P$, and thereafter, the second set of heads $H_L'$ and $H_T'$ respectively scan the track $T_{14}$ and a following track $T_{15}$ to record the tracking pilot signal $f_0$ in respective regions $T_P$ of these tracks. It will be appreciated that the first and second sets of heads will continue to alternately scan the magnetic tape 11 in the foregoing manner so that each set of heads scans a pair of tracks displaced by one track pitch from the pair of tracks scanned by the other set during the immediately preceding half cycle of the drum's rotation. It will also be appreciated that further portions of the track are available for recording data, such as the portion of each track between the data region D and the pilot signal recording region $T_P$.

Since the azimuth angles of the leading heads $H_L$ and $H_L'$ are the same, while the azimuth angles of the trailing heads $H_T$ and $H_T'$ are the same but different from those of the leading heads, and since the leading head of each set records its signals in a track scanned by the trailing head of the other set, it will be appreciated that the signals recorded in the data and pilot signal regions of each track possess different respective azimuth angles. In addition, since the leading and trailing heads of each set scan tracks adjacent those scanned by the leading and trailing heads of the other set, respectively, the pilot signals recorded in the regions $T_P$ of each track have the same azimuth angle as the video data D recorded in the adjacent tracks.

In reproducing the data recorded on the respective tracks $T_{11}$, $T_{12}$, $T_{13}$, . . . formed on the magnetic tape 11 in accordance with the first mode of operation, only the leading head $H_L$ and the trailing head $H_T$ of the first set are employed. Each of the leading and trailing heads $H_L$ and $H_T$ scans a track in which the video data D has the same azimuth angle as the scanning head. Accordingly, the pilot signal recording areas $T_P$ of the tracks adjacent to that scanned by each head likewise have the same azimuth angle as such head. Since the pilot signals are reproduced as crosstalk by a head scanning the data of an adjacent track but possessing the same azimuth angle as the crosstalk pilot signals, the head is relatively more sensitive to the pilot signals and is capable of more accurately reproducing them as compared, for example, to the prior apparatus explained above in connection with FIGS. 1 and 2.

With reference again to FIG. 5, when heads $H_L$ and $H_T$ respectively scan odd and even numbered tracks, the pilot signal $f_0$ is reproduced when head $H_L$ reaches a point $t_{10}$ in track $T_{11}$. Since the heads $H_L$ and $H_T$ are spaced apart by the distance $G_L$, head $H_T$ reaches a point $t_{10}'$ in track $T_{12}$ when head $H_L$ first detects the pilot signal. Due to the spacing of the heads $H_L$ and $H_T$, head $H_T$ does not at that time pick up a pilot signal crosstalk component. It is not until head $H_T$ advances to the position $t_{11}$ in track $T_{12}$ that a crosstalk pilot signal component is picked up by this head from the adjacent track $T_{13}$. It will be seen that the head $H_T$ reaches point tll at a delayed time $t_x$ from the point $t_{10}'$. That is, at this delayed time $t_x$, head $H_T$ picks up a crosstalk pilot signal component from only one adjacent track, namely the right track $T_{13}$.

When head $H_L$ reaches a point $t_{12}$ in track $T_{11}$ after a time delay $t_y$ from the point $t_{10}$, the leading head $H_L$ picks up the pilot signal $f_0$ only as crosstalk from the preceding track to the left side of the track $T_{11}$ and it is thus able at time $t_{12}$ to reproduce the crosstalk pilot signal from the preceding track. A tracking error is determined by sensing the difference between the separately detected pilot signal crosstalk components and a tracking control operation is carried out based upon such tracking error signal.

Accordingly, the embodiment of the invention illustrated in FIGS. 3–5 is able to produce a tracking error signal by detecting pilot signals recorded in tracks adjacent a track being scanned as crosstalk with good sensitivity since azimuth loss is avoided, so that the tracking control function can be carried out with high accuracy. The present embodiment also advantageously provides a relatively simple structure for recording and reproducing both NTSC-type signals and high definition video signals by utilizing the same magnetic heads for recording the pilot signal and recording and reproducing the high-definition video signal.

It will be appreciated from the foregoing description that the pilot signal recording pattern disclosed herein is but one alternative in that it is possible to record pilot signals in accordance with the present invention in a variety of recording patterns with the use of double azimuth heads. For example, the pilot signal can be recorded by only one of the second set of double azimuth heads in a pattern such that the pilot signals are recorded only in every other track. It will be further appreciated that in place of the second set of double azimuth heads described above in connection with FIG. 3, a single magnetic head may be provided at a position spaced by 180° from the first pair of heads for recording the pilot signal. While the embodiment of FIGS. 3–5 has been described for use as a digital VTR, it will be seen that the invention is equally applicable for a variety of recording and reproducing purposes in which recording and reproduction are carried out with the use of rotary heads.

Although a specific embodiment of the invention has been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for recording information signals and tracking signals on magnetic tape, comprising:

first and second magnetic head means for recording said information signals on said magnetic tape;

mounting means for mounting the first and second magnetic head means for rotation about an axis for scanning said magnetic tape with said first and second magnetic head means to record said information signals in successive tracks on said magnetic tape;

said first and second magnetic head means being disposed at respective positions along said axis separated from one another by substantially one track pitch and having respectively different azimuth angles;

third magnetic head means for recording said tracking signals on said magnetic tape; said third magnetic head means being mounted by said mounting means at a position rotationally substantially opposite a rotational position of said first magnetic head means and substantially axially aligned therewith and having an azimuth angle substantially the same as that of said first magnetic head means; and signal source means for providing said first and second magnetic head means with said information signals and said third magnetic head means with said tracking signals so that an information signal and a tracking signal are recorded with respectively different azimuth angles in at least one of said successive tracks and the azimuth angle with which said tracking signal is recorded in said one track is the same as the azimuth angle with which said information signals are recorded in tracks adjacent said one track.

2. The apparatus of claim 1, wherein said signal source means is operative to provide said information signals in digital form.

3. The apparatus of claim 1, further comprising fourth magnetic head means for recording said tracking signals on said magnetic tape; said fourth magnetic head means being mounted by said mounting means adjacent said third magnetic head means and having a respective azimuth angle differing from a respective azimuth angle of said third magnetic head means.

4. The apparatus of claim 3, wherein said signal source means is operative in a first mode of operation to supply the third and fourth magnetic head means with said tracking signals for recording on said magnetic tape, and is operative in a second mode of operation to supply said third and fourth magnetic head means with said information signals for recording on said magnetic tape.

5. The apparatus of claim 4, wherein said signal source means is operative in said first recording mode to supply said first and second magnetic head means with said information signal in the form of a standard definition video for recording on said magnetic tape.

6. The apparatus of claim 4, wherein said signal source means is operative in said second recording mode to supply the first through fourth magnetic head means with said information signal in the form of a high definition video for recording on said magnetic tape.

7. The apparatus of claim 3, wherein said fourth magnetic head means is mounted by said mounting means at a position rotationally substantially opposite a rotational position of said second magnetic head means and substantially axially aligned therewith, the azimuth angle of said fourth magnetic head means being substantially the same as that of said second magnetic head means.

8. The apparatus of claim 7, wherein the signal source means is operative to supply said information signal to said first and second magnetic head means in the form of a standard definition video signal and to supply said tracking signals to said third and fourth magnetic head means, and wherein the mounting means is operative to rotate the first through fourth magnetic head means at a predetermined rotational speed selected with respect to a transport speed of said magnetic tape such that the third and fourth magnetic head means scan tracks which are one track pitch displaced from tracks last scanned by said first and second magnetic head means, respectively, such that said information signals and said tracking signals are recorded on respective tracks with different respective azimuth angles.

9. The apparatus of claim 1, wherein the mounting means is operative to rotate the first, second and third magnetic head means at a predetermined rotational speed selected with respect to a transport speed of said magnetic tape such that the third magnetic head means scans tracks which are one track pitch displaced from tracks last scanned by said first magnetic head means, so that said information signals and tracking signals are recorded on adjacent tracks by said first and third magnetic head means with substantially the same respective azimuth angles.

10. A method of recording information signals and tracking signals on magnetic tape, comprising the steps of:

recording said information signals in successive tracks on said magnetic tape with the use of first and second magnetic head means mounted for rotation about an axis at respective axial positions spaced by substantially one track pitch and having respectively different azimuth angles, such that said information signals are recorded with correspondingly different azimuth angles in successive tracks; and recording said tracking signals and said information signals with different respective azimuth angles in at least some of said successive tracks and with the azimuth angle with which said tracking signals are recorded in any one of said tracks being substantially the same as the azimuth angles of said information signals recorded in adjacent ones of said successive tracks.

11. The method of claim 10, wherein the step of recording said tracking signals comprises recording said tracking signals with the use of third magnetic head means mounted for rotation at a position rotationally substantially opposite a rotational position of the first magnetic head means and substantially axially aligned therewith.

* * * * *